United States Patent
Lv et al.

(10) Patent No.: US 12,015,628 B1
(45) Date of Patent: Jun. 18, 2024

(54) COMPLEX NETWORK ATTACK DETECTION METHOD BASED ON CROSS-HOST ABNORMAL BEHAVIOR RECOGNITION

(71) Applicant: ZHEJIANG UNIVERSITY OF TECHNOLOGY, Zhejiang (CN)

(72) Inventors: Mingqi Lv, Zhejiang (CN); Haiwen Liu, Zhejiang (CN); Haijiang Xie, Zhejiang (CN); Tiantian Zhu, Zhejiang (CN); Tieming Chen, Zhejiang (CN); Xiaoming Lu, Zhejiang (CN); Yiyang Yao, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 0 days.

(21) Appl. No.: 18/545,960

(22) Filed: Dec. 19, 2023

Related U.S. Application Data (63) Continuation of application No. PCT/CN2023/099376, filed on Jun. 9, 2023.

(30) Foreign Application Priority Data

Apr. 20, 2023 (CN) .......................... 202310423444.5

(51) Int. Cl.
 H04L 9/40 (2022.01)
(52) U.S. Cl.
 CPC ...... H04L 63/1425 (2013.01); H04L 63/1416 (2013.01)
(58) Field of Classification Search
 CPC .............. H04L 63/1425; H04L 63/1416
 See application file for complete search history.

(56) References Cited

U.S. PATENT DOCUMENTS

| | | | |
|---|---|---|---|
| 10,476,896 B2 * | 11/2019 | DiValentin | G06F 16/254 |
| 2018/0083995 A1 * | 3/2018 | Sheth | G06F 16/958 |

(Continued)

FOREIGN PATENT DOCUMENTS

| | | | | |
|---|---|---|---|---|
| CN | 116668082 A | * | 8/2023 | |
| KR | 20220072697 A | * | 6/2022 | H04L 63/308 |

OTHER PUBLICATIONS

C. Wang and H. Zhu, "Wrongdoing Monitor: A Graph-Based Behavioral Anomaly Detection in Cyber Security," in IEEE Transactions on Information Forensics and Security, vol. 17, pp. 2703-2718, 2022 (Year: 2022).*

(Continued)

*Primary Examiner* — Michael R Vaughan
(74) *Attorney, Agent, or Firm* — JCIPRNET

(57) ABSTRACT

The present disclosure discloses a complex network attack detection method based on cross-host abnormal behavior recognition, and the method includes the following steps: 1) firstly collecting kernel log data of a host to construct an intra-host association graph, then employing a graph convolution network (GCN) to extract features, and finally using an autoencoder to detect abnormal nodes in the intra-host association graph; 2) firstly constructing an inter-host interaction graph by using network flow log data, then training a prediction model based on a sequence of the inter-host interaction graph, and finally detecting abnormal edges in the inter-host interaction graph according to prediction differences; and 3) firstly constructing a cross-host exception association graph according to intra-host and inter-host exception detection results, then spreading exception scores by employing a PageRank algorithm, and finally confirming an attacked host based on the exception scores.

2 Claims, 8 Drawing Sheets

(56) References Cited

U.S. PATENT DOCUMENTS

| | | | |
|---|---|---|---|
| 2020/0120109 A1* | 4/2020 | Shu | H04L 63/20 |
| 2021/0067527 A1* | 3/2021 | Chen | G06N 3/08 |
| 2021/0067549 A1* | 3/2021 | Chen | G06N 3/084 |
| 2021/0176260 A1* | 6/2021 | Pan | G06N 5/022 |
| 2021/0248443 A1* | 8/2021 | Shu | G06F 16/9024 |
| 2022/0253531 A1* | 8/2022 | Kim | G06F 11/323 |
| 2023/0262074 A1* | 8/2023 | Guo | H04L 63/083 726/22 |

OTHER PUBLICATIONS

X. Xu, H. Wang, A. Lal, C. A. Gunter and B. Li, "EDoG: Adversarial Edge Detection for Graph Neural Networks," 2023 IEEE Conference on Secure and Trustworthy Machine Learning (SaTML), Raleigh, NC, USA, 2023, pp. 291-305 (Year: 2023).*

S. Qin, L. Chen, Y. Luo and G. Tao, "Multiview Graph Contrastive Learning for Multivariate Time-Series Anomaly Detection in IoT," in IEEE Internet of Things Journal, vol. 10, No. 24, pp. 22401-22414, 15 Dec. 15, 2023 (Year: 2023).*

\* cited by examiner

COMPLEX NETWORK ATTACK DETECTION METHOD BASED ON CROSS-HOST ABNORMAL BEHAVIOR RECOGNITION

CROSS-REFERENCE TO RELATED APPLICATION

This application is a continuation of international PCT application serial no. PCT/CN2023/099376, filed on Jun. 9, 2023, which claims priority benefit of China patent application No. 202310423444.5 filed on Apr. 20, 2023. The entirety of each of the above-mentioned patent applications is hereby incorporated by reference herein and made a part of this specification.

TECHNICAL FIELD

The present disclosure relates to the technical field of network security and deep learning, and particularly relates to a complex network attack detection method based on cross-host abnormal behavior recognition.

BACKGROUND

Complex network attacks are becoming increasingly prominent in an era of modern networks. The complex network attacks are persistent network attacks made through various means. An attacker first uses various techniques to penetrate a host in a target network, and then achieves lateral movement from the host to another host for internal reconnaissance and data theft. These features of the complex network attacks make it difficult to deal with them by use of traditional single-point network attack methods.

According to recent studies, a provenance graph is a most effective tool for detecting complex network attacks. The provenance graph is an association graph constructed based on kernel log data of an operating system, its nodes represent system entities (such as processes and files), and its edges represent system events (such as process reading files). The provenance graph is capable to capture control flow and data flow between the system entities well, and better reflects the contextual correlation and causal relationship between the system events, so that a better effect is achieved in detecting long-term, multi-step complex network attacks. In a further aspect, with rapid development of deep learning, a deep learning technology, particularly a graph neural network technology capable of effectively processing provenance graphs, is gradually applied to detecting complex network attacks.

However, there still exist deficiencies in the existing complex network attack detection technology that integrates provenance graphs and deep learning: first, the prior art still focuses on detecting single attack events, and cannot perform correlation analysis on events of attacks on a plurality of hosts. Second, due to lack of correlation analysis of attack events in the prior art, the false alarm rate is very high. Third, the prior art relies on a large number of labeled training samples.

SUMMARY

To overcome defects in the prior art, the present disclosure provides a complex network attack detection method based on cross-host abnormal behavior recognition.

The technical solution of the present disclosure is as follows:

a complex network attack detection method based on cross-host abnormal behavior recognition, including the following steps:
1) intra-host abnormal behavior detection: firstly collecting kernel log data of a host to construct an intra-host association graph, then employing a graph convolution network (GCN) to extract features, and finally using an autoencoder to detect abnormal nodes in the intra-host association graph;
2) inter-host abnormal behavior detection: firstly constructing an inter-host interaction graph by using network flow log data, then training a prediction model based on a sequence of the inter-host interaction graph, and finally detecting abnormal edges in the inter-host interaction graph according to prediction differences; and
3) cross-host network attack detection: firstly constructing a cross-host anomaly association graph according to intra-host and inter-host anomaly detection results, then propagating anomaly scores by employing a PageRank algorithm, and finally confirming an attacked host based on the anomaly scores.

Further, in the step 1), detailed steps of the intra-host abnormal behavior detection are as follows:
1.1) constructing a benign intra-host association graph: for each host $H_k$ in a target network, using an operating system kernel log collection tool to collect system log data generated during normal operation of the host, and constructing an association graph $nIAG_k$, where nodes of $nIAG_k$ represent system entities, and edges thereof represent interaction events that occur between the system entities;
1-2) extracting initial features of the nodes: an initial feature vector $x_i$ of each node $v_i$ in $nIAG_k$ is $[\alpha_{i1}, \alpha_{i2}, \ldots, \alpha_{iN}]$, where $\alpha_{ij}$ is the number of edges of a $j^{th}$ type among a set of edges formed by connecting the node $v_i$ to its one-hop neighbor nodes in $nIAG_k$;
1-3) extracting semantic features of the nodes: using a graph convolutional neural network to process $nIAG_k$, and updating the feature vector of each node $v_i$ in $nIAG_k$, to obtain a semantic feature vector $y_i$ of each node $v_i$;
1-4) autoencoder training: first, collecting semantic feature vectors of all "process" nodes in $nIAG_k$ of all hosts; then, inputting these semantic feature vectors into an autoencoder for training; two multi-layer perceptrons of the autoencoder serve as an encoder and a decoder respectively, where the encoder encodes the inputted semantic feature vector $y_i$ into a low-dimensional implicit vector, and the decoder decodes the implicit vector into a reconstruction vector $z_i$ with the same dimension as the inputted semantic feature vector; an objective of the training is to minimize differences between the inputted semantic feature vector $y_i$ and the outputted reconstruction vector $z_i$;
1-5) intra-host anomaly detection: first, collecting real-time system log data of each host $H_k$ in the target network and constructing an association graph $rIAG_k$; then, extracting the semantic feature vector of each node in $rIAG_k$ according to the methods in the steps 1-2) and 1-3); finally, inputting the semantic feature vector $y_i$ of each "process" node $v_i$ in $rIAG_k$ into the autoencoder trained in the step 1-4), to obtain the outputted reconstruction vector $z_i$; when a difference between $y_i$ and $z_i$ is greater than a specified threshold, the node $v_i$ is deemed to be an abnormal node; and 1-6) intra-host anomaly scoring: first, calculating an anomaly score of each abnormal node $v_i$ according to the formula (1), and then calculating the anomaly score of the host $H_k$ according to the formula (2), where $B(H_k)$ represents a set of abnormal nodes of the host $H_k$.

$$s(v_i) = \|y_i - z_i\|_F^2 \quad (1)$$

$$s(H_k) = \max_{v_i \in B(H_k)} s(v_i) \quad (2)$$

Further, in the step 2), detailed steps of the inter-host abnormal behavior detection are as follows:

2-1) constructing a sequence of inter-host interaction graphs: using a network traffic capture tool to collect log data of network interactions between all hosts in the target network during normal operation of the hosts; a node of an inter-host interaction graph $IRG_t$ at each discrete time slot t is a host, and an edge represents an interaction between different hosts at the time slots t-1 and t; a sequence of inter-host interaction graphs at continuous time slots can be defined as $IRGS=<IRG_1, IRG_2, \ldots, IRG_T>$;

2-2) constructing a training set: using a sliding window with a window size of w and a step size of 1 to segment a historical sequence of an inter-host interaction graph to obtain a large number of training samples and further form a training set SS; each training sample $S_t$, in the SS is defined as $(D_t, L_t)$, where $D_t=<IRG_{t-w}, IRG_{t-w+1}, \ldots, IRG_{t-1}>$ is a data part of $S_t$, and $L_t=IRG_t$ is a label part of $S_t$;

2-3) training an inter-host interaction graph prediction model: training a prediction model based on the training set SS, and predicting the next inter-host interaction graph according to w continuous inter-host interaction graphs; it is assumed that that $S_t$, is an inputted sample, a structure of the prediction model consists of the following four layers:

an input layer: it is assumed that the system's network structure (i.e., the hosts in the network) remains unchanged, so the node sets of different inter-host interaction graphs are the same, and therefore only an adjacent matrix of an edge set of an inter-host interaction graph is inputted, that is, $<IRA_{t-w}, IRA_{t-w+1}, \ldots, IRA_{t-1}>$ is inputted, where $IRA_k$ is an adjacent matrix of an edge set of $IRG_k$;

a convolutional layer: each $IRA_k$ is inputted into a convolutional neural network to generate a feature matrix $CM_k$;

a circulation layer: t continuous feature matrices $<CM_{t-w}, CM_{t-w+1}, \ldots, CM_{t-1}>$ are inputted into an LSTM to generate a feature matrix RM;

an output layer: RM is inputted into a fully connected neural network to generate an adjacent matrix $pIRA_t$ at a predicted time slot t; and 2-4) inter-host anomaly detection: first, following the step 2-1) to generate w inter-host interaction graphs $D_t=<IRG_{t-w}, IRG_{t-w+1}, \ldots, IRG_{t-1}>$ before the current time slot t; then, inputting $D_t$ into the prediction model trained in the step 2-3) to predict and obtain an adjacent matrix $pIRA_t$, at the time slot t; finally, comparing $pIRA_t$, with a real adjacent matrix $IRA_t$, at the time slot t; when $pIRA_t[i][j]=0$, while $IRA_t[i][j]=1$, which means that the model predicts that there should be no interaction between hosts $H_i$ and $H_j$ at the time slot t, but in fact there is an interaction between them, the interaction between the hosts $H_i$ and $H_j$ at the time slot t is deemed to be abnormal.

Further, in the step 3), detailed steps of cross-host complex network attack detection are as follows:

3-1) constructing a cross-host anomaly association graph: constructing a cross-host anomaly association graph as follows according to a given time slot t, an intra-host data collection time span w, and a set $(HS=\{H_1, H_2, \ldots, H_M\})$ of hosts in the target network:

3-1-1) following the step 1-1) to collect system log data of each host in HS generated between time slots t-w and t, and constructing a real-time intra-host association graph $rIAG_k$ for each host $H_k$;

3-1-2) based on the real-time intra-host association graph $rIAG_k$ of each host $H_k$, detecting abnormal nodes in $rIAG_k$ according to the step 1-5), and performing anomaly scoring for each host $H_k$ according to the step 1-6);

3-1-3) following the step 2-1) to collect the inter-host interaction graphs generated between the time slots t-w and t, and forming a sequence $D_t=<IRG_{t-w}, IRG_{t-w+1}, \ldots, IRG_{t-1}>$ of the inter-host interaction graphs;

3-1-4) following the step 2-4) to detect any inter-host abnormal interaction at the time slot t; and 3-1-5) constructing a cross-host anomaly association graph CG, where each node $p_k$ represents a host $H_k$; when an interaction between the hosts $H_i$ and $H_j$ at the time slot t is abnormal, there exists an edge between nodes $p_i$ and $p_j$;

3-2) propagating the anomaly scores: using the PageRank algorithm to iteratively update a weight of each node in CG, with detailed steps as follows:

3-2-1) setting an initial weight $PR(p_k)$ of each node $p_k$ in CG as an anomaly score $s_k$ of $H_k$;

3-2-2) updating the weight of each node $p_k$ in CG according to the formula (3); in the formula (3), d is a damping coefficient, $N_{CG}$ is the number of nodes in CG, $I(p_k)$ is a set of nodes corresponding to all incoming edges of the node $p_k$, and $L(p_i)$ is an outgoing degree of the node $p_i$;

$$PR(p_k) = \frac{1-d}{N_{CG}} + d\left(\sum_{p_i \in I(p_k)} \frac{PR(p_i)}{L(p_i)}\right) \quad (3)$$

3-2-3) when weight variation of any node after this iteration is less than a specified threshold, or the number of iterations reaches a specified upper limit, stopping the iteration, otherwise jumping to the step 3-2-2) to restart the iteration; and 3-3) detecting an attacked host: confirming a host represented by a node in CG whose weight is higher than the specified threshold as the attacked host, and confirming a pair of attacked hosts connected by an edge as lateral movement targets of an attacker.

DETAILED DESCRIPTION OF THE EMBODIMENTS

The present disclosure will be further described below with reference to the accompanying drawings.

Figure 1:
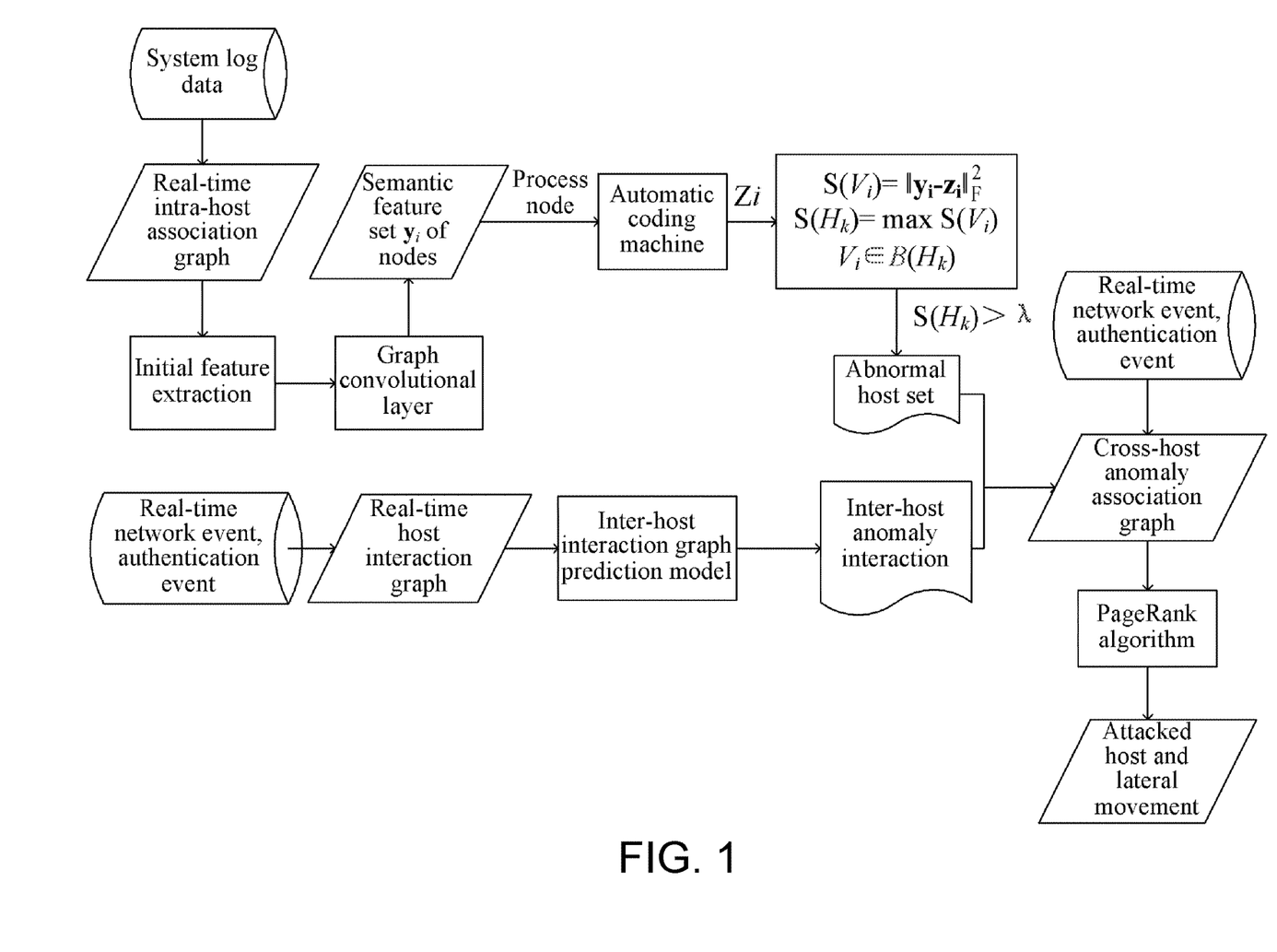
FIG. 1 is a flow chart of a method of the present disclosure.
Figure 2:
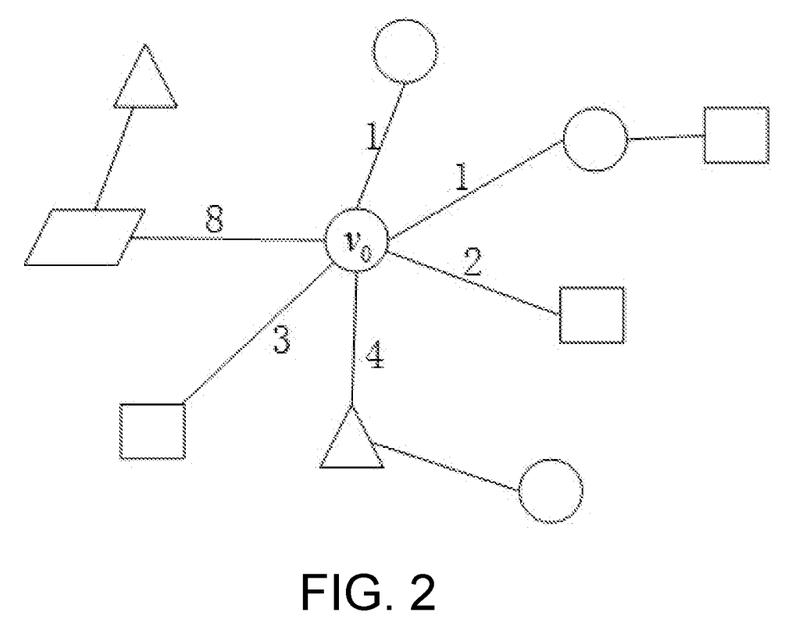
FIG. 2 is a diagram of an example in which an initial feature of a node in an intra-host association graph of the present disclosure is extracted.

With reference to FIG. 1, a complex network attack detection method based on cross-host abnormal behavior recognition, includes the following steps:

1) intra-host abnormal behavior detection: firstly collecting kernel log data of a host to construct an intra-host association graph, then employing a graph convolution network (GCN) to extract features, and finally using an autoencoder to detect abnormal nodes in the intra-host association graph;

detailed steps of the intra-host abnormal behavior detection are as follows:

1-1) constructing a benign intra-host association graph: for each host $H_k$ in a target network, using an operating system kernel log collection tool (such as Event Tracing for Windows (ETW) and Auditd of the Linux Auditing System) to collect system log data generated during normal operation of the host, and constructing an association graph $nIAG_k$ (known as a normal intra-host association graph), where nodes of $nIAG_k$ represent system entities (such as processes and files), and edges thereof represent interaction events (such as process reading files) that occur between the system entities;

1-2) extracting initial features of the nodes: an initial feature vector $x_i$ of each node $v_i$ in $nIAG_k$ is $[\alpha_{i1}, \alpha_{i2}, \ldots, \alpha_{iN}]$, where $\alpha_{ij}$ is the number of edges of a $j^{th}$ type among a set of edges formed by connecting the node $v_i$ to its one-hop neighbor nodes in $nIAG_k$ (a total of N types of edges); FIG. 2 shows an example, in which it is assumed that when there are 8 types of edges in total, and there are 6 edges formed by connecting a central node $v_0$ with its one-hop neighbor nodes (the number on an edge is a type number), the initial feature vector of $v_0$ is [2, 1, 1, 1, 0, 0, 0, 1];

1-3) extracting semantic features of the nodes: using a graph convolutional neural network to process $nIAG_k$, and updating the feature vector of each node $v_i$ in $nIAG_k$, to obtain a semantic feature vector $y_i$ of each node $v_i$;

1-4) autoencoder training: first, collecting semantic feature vectors of all "process" nodes in $nIAG_k$ of all hosts; then, inputting these semantic feature vectors into an autoencoder for training; two multi-layer perceptrons of the autoencoder serve as an encoder and a decoder respectively, where the encoder encodes the inputted semantic feature vector $y_i$ into a low-dimensional implicit vector, and the decoder decodes the implicit vector into a reconstruction vector $z_i$ with the same dimension as the inputted semantic feature vector; an objective of the training is to minimize differences between the inputted semantic feature vector $y_i$ and the outputted reconstruction vector $z_i$;

1-5) intra-host anomaly detection: first, collecting real-time system log data of each host $H_k$ in the target network and constructing an association graph $rIAG_k$ (known as a real-time intra-host association graph); then, extracting the semantic feature vector of each node in $rIAG_k$ according to the methods in the steps 1-2) and 1-3); finally, inputting the semantic feature vector $y_i$ of each "process" node $v_i$ in $rIAG_k$ into the autoencoder trained in the step 1-4), to obtain the outputted reconstruction vector $z_i$; when a difference between $y_i$ and $z_i$ is greater than a specified threshold, the node $v_i$ is deemed to be an abnormal node; and 1-6) intra-host anomaly scoring: first, calculating an anomaly score of each abnormal node $v_i$ according to the formula (1), and then calculating the anomaly score of the host $H_k$ according to the formula (2), where $B(H_k)$ represents a set of abnormal nodes of the host $H_k$;

$$s(v_i) = \|y_i - z_i\|_F^2 \tag{1}$$

$$s(H_k) = \max_{v_i \in B(H_k)} s(v_i) \tag{2}$$

Figure 3:
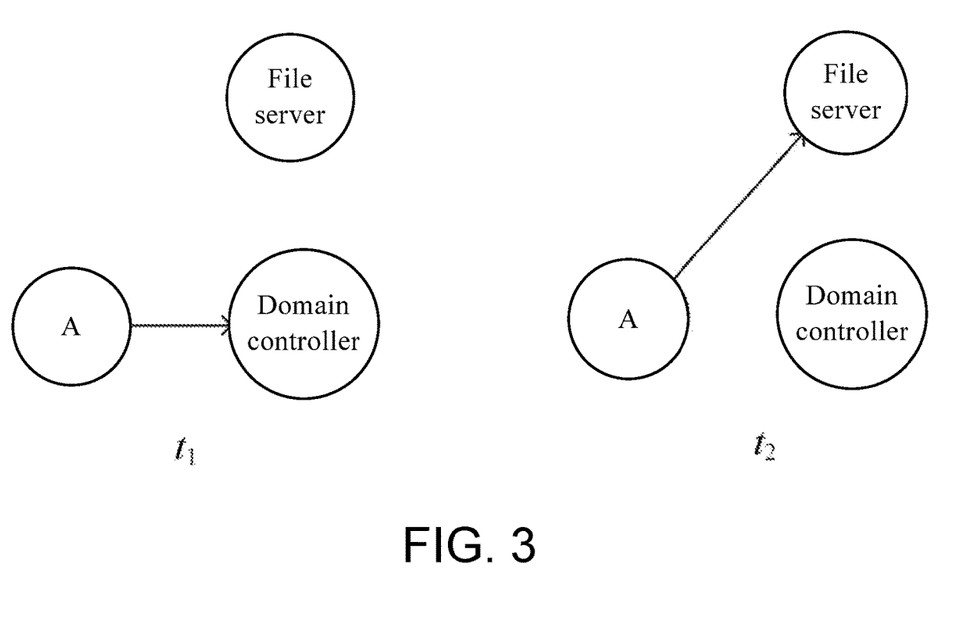
FIG. 3 is an example diagram of an inter-host interaction graph sequence of the present disclosure.
Figure 4:
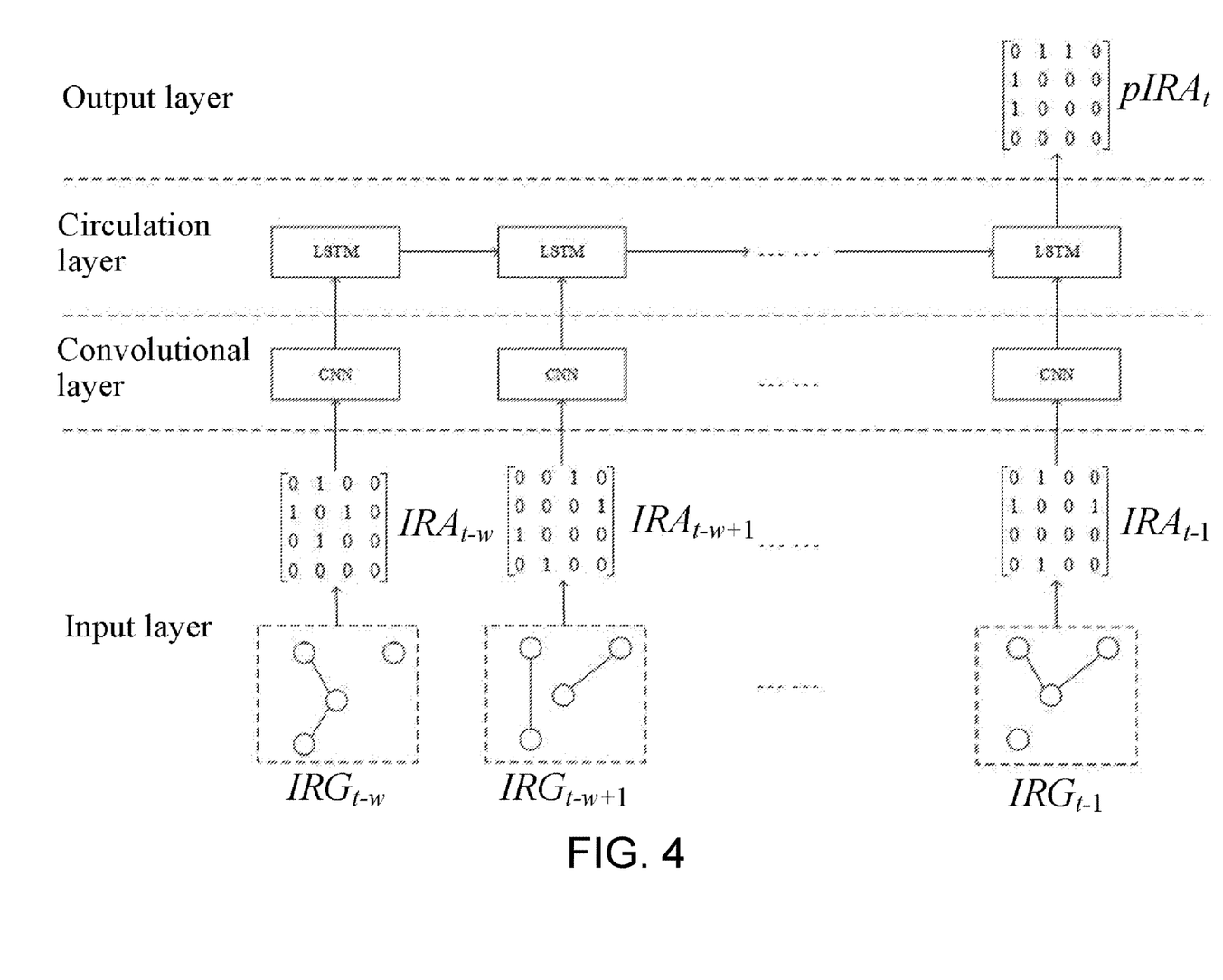
FIG. 4 is a network structure diagram of an inter-host interaction graph prediction model of the present disclosure.

2) inter-host abnormal behavior detection: firstly constructing an inter-host interaction graph by using network flow log data, then training a prediction model based on a sequence of the inter-host interaction graph, and finally detecting abnormal edges in the inter-host interaction graph according to prediction differences; and detailed steps of the inter-host abnormal behavior detection are as follows:

2-1) constructing a sequence of inter-host interaction graphs: using a network traffic capture tool to collect log data of network interactions between all hosts in the target network during normal operation of the hosts; a node of an inter-host interaction graph $IRG_t$ at each discrete time slot t is a host, and an edge represents an interaction between different hosts at the time slots t-1 and t; a sequence of inter-host interaction graphs at continuous time slots can be defined as $IRGS=<IRG_1, IRG_2, \ldots, IRG_T>$; FIG. 3 shows an example, in which at a time slot $t_1$, a host of a user A accesses a host as a domain controller for authentication, and at a time slot $t_2$, the host of the user A accesses a host as a file server; it can be seen that node sets of the inter-host interaction graphs at different time slots are the same, but edge sets are different;

2-2) constructing a training set: using a sliding window with a window size of w and a step size of 1 to segment a historical sequence of an inter-host interaction graph to obtain a large number of training samples and further form a training set SS; each training sample $S_t$ in the SS is defined as $(D_t, L_t)$, where $D_t=<IRG_{t-w}, IRG_{t-w+1}, \ldots, IRG_{t-1}>$ is a data part of $S_t$, and $L_t=IRG_t$ is a label part of $S_t$;

2-3) training an inter-host interaction graph prediction model: training a prediction model based on the training set SS, and predicting the next inter-host interaction graph according to w continuous inter-host interaction graphs;

it is assumed that that $S_t$, is an inputted sample, a structure of the prediction model consists of the following four layers, as shown in FIG. 4:

an input layer: it is assumed that the system's network structure (i.e., the hosts in the network) remains unchanged, so the node sets of different inter-host interaction graphs are the same, and therefore only an adjacent matrix of an edge set of an inter-host interaction graph is inputted, that is, <$IRA_{t-w}$, $IRA_{t-w+1}$, ..., $IRA_{t-1}$> is inputted, where $IRA_k$ is an adjacent matrix of an edge set of $IRG_k$;

a convolutional layer: each $IRA_k$ is inputted into a convolutional neural network to generate a feature matrix $CM_k$;

a circulation layer: t continuous feature matrices <$CM_{t-w}$, $CM_{t-w+1}$, ..., $CM_{t-1}$> are inputted into an LSTM to generate a feature matrix RM;

an output layer: RM is inputted into a fully connected neural network to generate an adjacent matrix $pIRA_t$, at a predicted time slot t; and 2-4) inter-host anomaly detection: first, following the step 2-1) to generate w inter-host interaction graphs $D_t$=<$IRG_{t-w}$, $IRG_{t-w+1}$, ..., $IRG_{t-1}$> before the current time slot t; then, inputting $D_t$ into the prediction model trained in the step 2-3) to predict and obtain an adjacent matrix $pIRA_t$, at the time slot t; finally, comparing $pIRA_t$, with a real adjacent matrix $IRA_t$, at the time slot t; when $pIRA_t[i][j]=0$, while $IRA_t[i][j]=1$, which means that the model predicts that there should be no interaction between hosts $H_i$ and $H_j$ at the time slot t, but in fact there is an interaction between them, the interaction between the hosts $H_i$ and $H_j$ at the time slot t is deemed to be abnormal;

3) cross-host complex network attack detection: firstly constructing a cross-host anomaly association graph according to intra-host and inter-host anomaly detection results, then propagating anomaly scores by employing a PageRank algorithm, and finally confirming an attacked host based on the anomaly scores;

detailed steps of cross-host complex network attack detection are as follows:

3-1) constructing a cross-host anomaly association graph: constructing a cross-host anomaly association graph as follows according to a given time slot t, an intra-host data collection time span w, and a set (HS={$H_1$, $H_2$, ..., $H_M$}) of hosts in the target network:

3-1-1) following the step 1-1) to collect system log data of each host in HS generated between time slots t-w and t, and constructing a real-time intra-host association graph $rIAG_k$ for each host $H_k$;

3-1-2) based on the real-time intra-host association graph $rIAG_k$ of each host $H_k$, detecting abnormal nodes in $rIAG_k$ according to the step 1-5), and performing anomaly scoring for each host $H_k$ according to the step 1-6) (an anomaly score of $H_k$ is recorded as $s_k$);

3-1-3) following the step 2-1) to collect the inter-host interaction graphs generated between the time slots t-w and t, and forming a sequence $D_t$=<$IRG_{t-w}$, $IRG_{t-w+1}$, ..., $IRG_{t-1}$> of the inter-host interaction graphs;

3-1-4) following the step 2-4) to detect any inter-host abnormal interaction at the time slot t; and 3-1-5) constructing a cross-host anomaly association graph CG, where each node $p_k$ represents a host $H_k$; when an interaction between the hosts $H_i$ and $H_j$ at the time slot t is abnormal, there exists an edge between nodes $p_i$ and $p_j$;

3-2) propagating the anomaly scores: using the PageRank algorithm to iteratively update a weight of each node in CG, with detailed steps as follows:

3-2-1) setting an initial weight $PR(p_k)$ of each node $p_k$ in CG as an anomaly score $s_k$ of $H_k$;

3-2-2) updating the weight of each node $p_k$ in CG according to the formula (3); in the formula (3), d is a damping coefficient, $N_{CG}$ is the number of nodes in CG, $I(p_k)$ is a set of nodes corresponding to all incoming edges of the node $p_k$, and $L(p_i)$ is an outgoing degree of the node $p_i$;

$$PR(p_k) = \frac{1-d}{N_{CG}} + d\left(\sum_{p_i \in I(p_k)} \frac{PR(p_i)}{L(p_i)}\right) \quad (3)$$

3-2-3) when weight variation of any node after this iteration is less than a specified threshold, or the number of iterations reaches a specified upper limit, stopping the iteration, otherwise jumping to the step 3-2-2) to restart the iteration; and 3-3) detecting an attacked host: confirming a host represented by a node in CG whose weight is higher than the specified threshold as the attacked host, and confirming a pair of attacked hosts connected by an edge as lateral movement targets of an attacker.

Embodiment 1

A given small network system includes a plurality of hosts and a domain controller, where a system kernel log collection tool is installed in each host, and a network traffic capture tool is installed in the domain controller. On this basis, this embodiment includes two parts, i.e., model training and real-time detection, where the model training further includes two parts: intra-host abnormal behavior detection model training and inter-host abnormal behavior detection model training.

Figure 5:
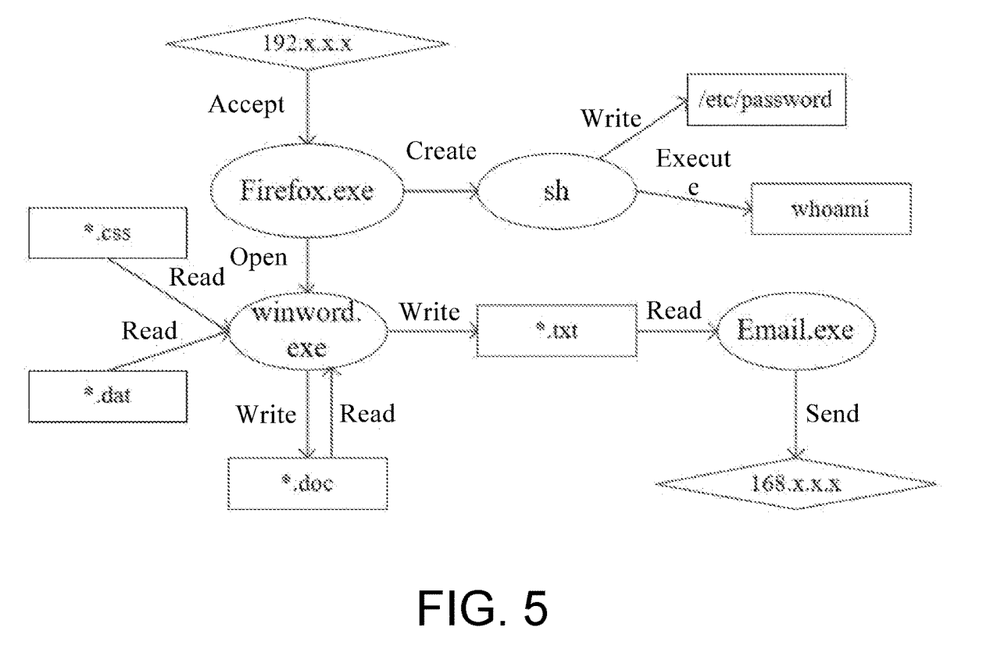
FIG. 5 is a benign intra-host association graph of Embodiment 1 of the present disclosure.

1. Intra-Host Abnormal Behavior Detection Model Training
   (1) The system kernel log collection tool is used to collect log data of each host generated in the normal working process, and a benign intra-host association graph is constructed according to the step 1-1). As shown in FIG. 5, an example of a benign intra-host association graph is given.
   (2) According to the step 1-2), initial features of nodes in the benign intra-host association graph are extracted, and when there are 7 types of edges [read, open, write, accept, create, execute, and send] in the benign intra-host association graph, the initial feature of a winword.exe node is expressed as [3, 1, 2, 0, 0, 0, 0]; then, feature vectors of all nodes are updated according to the step 1-3); finally, according to the step 1-4), feature vectors of all nodes are inputted to train an autoencoder $M_1$.

Figure 6:
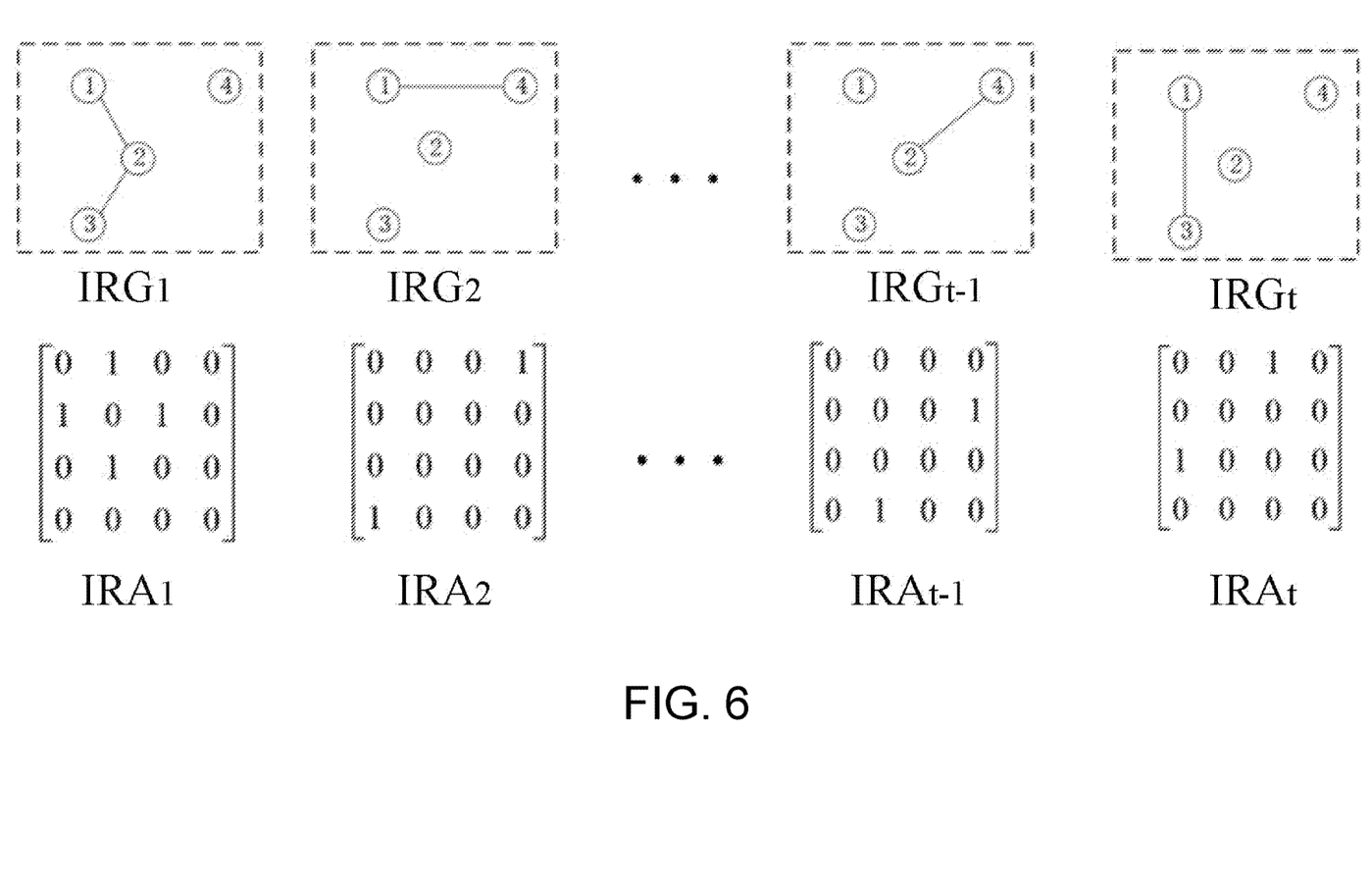
FIG. 6 is a diagram of an inter-host interaction graph sequence of Embodiment 1 of the present disclosure.

2. Inter-Host Abnormal Behavior Detection Model Training
   (1) The network traffic capture tool is used to collect data of interactions between hosts in the network system, and an inter-host interaction graph sequence is constructed according to the step 2-1). As shown in FIG. 6, an example of an inter-host interaction graph sequence is given (in the figure, each edge represents an inter-host interaction during that time period).
   (2) A training set is constructed according to the step 2-2), and then an inter-host interaction graph prediction model $M_2$ is trained according to the step 2-3).

Figure 7:
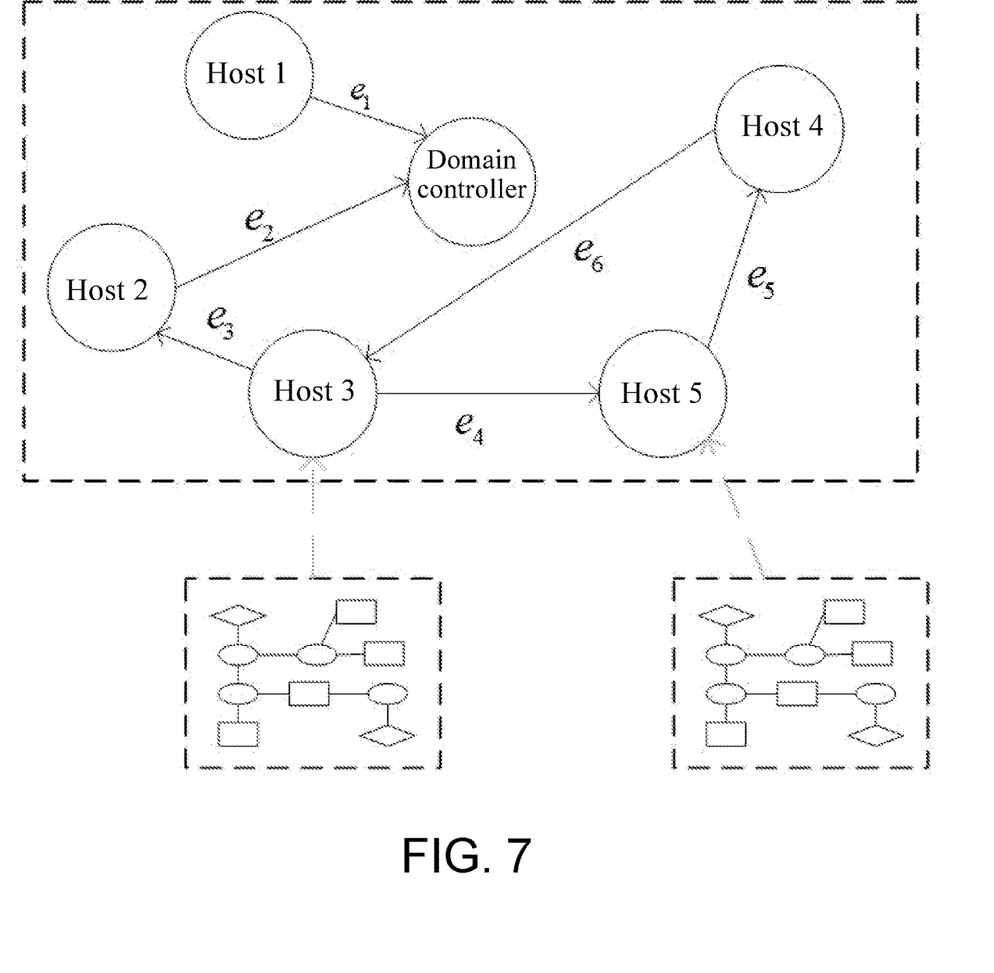
FIG. 7 is a real-time detection input diagram of Embodiment 1 of the present disclosure.
Figure 8:
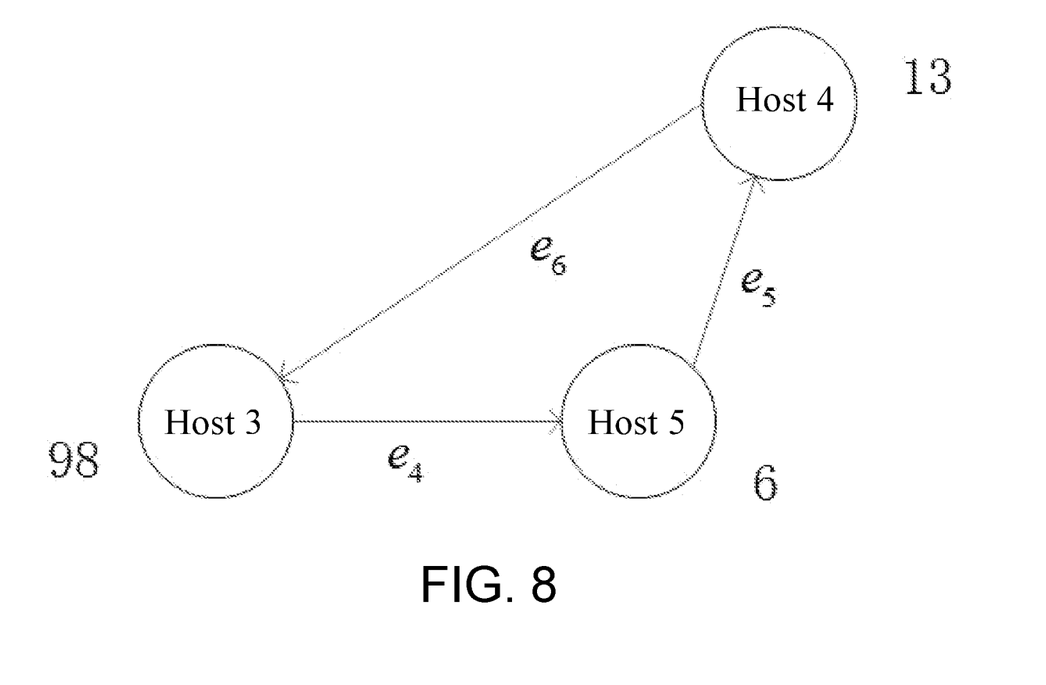
FIG. 8 is a cross-host anomaly association diagram of Embodiment 1 of the present disclosure.

3. Real-Time Detection
  (1) The intra-host association graph of each host and the inter-host interaction graph sequence of the network system are collected in a time range [t-w, t) for real-time detection, where t is a given current time slot; as shown in FIG. 7, an example of input for real-time detection is given.
  (2) A model $M_1$ is used to detect intra-host anomalies according to the step 1-5), and anomaly scores are calculated according to the step 1-6); the model $M_2$ is used to detect inter-host anomalies according to the step 2-3). When the detected abnormal interactions are defined as $e_4$, $e_5$, and $e_6$, and anomaly scores of a host 3, a host 4, and a host 5 are 98, 6, and 13 respectively, a cross-host anomaly association graph (as shown in FIG. 8) is constructed according to the step 3-1-5). Then, final anomaly scores of the host 3, the host 4, and the host 5 are calculated according to the step 3-2). When the final anomaly scores are 102, 18, and 21 respectively, it can be finally determined that the host 3 is an attacked host.

Compared with the prior art, the present disclosure has the following advantages:
  (1) through cross-host combined network attack detection, intra-host malicious operation events and inter-host lateral movement events are mutually verified, so that the false alarm rate can be effectively reduced; and
  (2) self-supervised deep learning technology is adopted, without need of any actual network attack training samples.

What is claimed is:

1. A complex network attack detection method based on cross-host abnormal behavior recognition, comprising the following steps:
  1) Intra-host abnormal behavior detection: firstly collecting kernel log data of a host to construct an intra-host association graph, then employing a graph convolution network (GCN) to extract features, and finally using an autoencoder to detect abnormal nodes in the intra-host association graph, wherein the step 1) further comprises:
    1-1) constructing a benign intra-host association graph: collecting system log data generated during normal operation of the host, and constructing an association graph $nIAG_k$, where nodes of the association graph $nIAG_k$ represent system entities, and edges thereof represent interaction events that occur between the system entities;
    1-2) extracting initial features of the nodes: an initial feature vector $x_i$ of each node $v_i$ in $nIAG_k$ is $[a_{i1}, a_{i2}, \ldots, a_{iN}]$, where $a_{ij}$ is the number of edges of a $j^{th}$ type among a set of edges formed by connecting the node $v_i$ to its one-hop neighbor nodes in the association graph $nIAG_k$;
    1-3) extracting semantic features of the nodes: using a graph convolutional neural network to process the association graph $nIAG_k$, and updating the feature vector of each node $v_i$ in the association graph $nIAG_k$, to obtain a semantic feature vector of each node;
    1-4) autoencoder training: collecting semantic feature vectors of all "process" nodes in the association graph $nIAG_k$ of all hosts, and inputting the semantic feature vectors into an autoencoder for training, to output a reconstruction vector;
    1-5) intra-host anomaly detection: collecting real-time system log data to construct an association graph $rIAG_k$; extracting a semantic feature vector $y_i$ of each process node in the association graph $rIAG_k$, and inputting the vector $y_i$ into the autoencoder trained in the step 1-4) to obtain the outputted reconstruction vector $z_i$; when a difference between the semantic feature vector $v_i$ and the reconstruction vector y is greater than a specified threshold, the process node is deemed to be an abnormal node; and
    1-6) intra-host anomaly scoring: calculating an anomaly score of each abnormal node $v_i$ according to the formula (1), and then calculating the anomaly score of the host $H_k$ according to formula (2), where $B(H_k)$ represents a set of abnormal nodes of the host $H_k$ $$s(v_i) = \|y_i - z_i\|_F^2 \quad (1)$$

$$s(H_k) = \max_{v_i \in B(H_k)} s(v_i); \quad (2)$$

2) Inter-host abnormal behavior detection: firstly constructing an inter-host interaction graph by using network flow log data, then training a prediction model based on a sequence of the inter-host interaction graph, and finally detecting abnormal edges in the inter-host interaction graph according to prediction differences, wherein the step 2) further comprises:
    2-1) constructing a sequence of inter-host interaction graphs: collecting log data of inter-host network interactions to construct an inter-host interaction graph $IRG_t$; a node of an inter-host interaction graph $IRG_t$ at each discrete time slot t is a host, and an edge represents an interaction between different hosts at the time slots t-1 and t; a sequence of inter-host interaction graphs at continuous time slots can be defined as $IRGS=\langle IRG_1, IRG_2, \ldots, IRG_T \rangle$;
    2-2) constructing a training set: using a sliding window with a window size of w and a step size of 1 to segment a sequence of an inter-host interaction graph to form a training set SS; each training sample $S_t$ in the SS is defined as $(D_t, L_t)$, where $D_t$, is a data part of $S_t$, and $L_t$ is a label part of $S_t$;
    2-3) training an inter-host interaction graph prediction model: training a prediction model based on the training set SS, and predicting the next inter-host interaction graph according to w continuous inter-host interaction graphs; and
    2-4) inter-host anomaly detection: following the step 2-1) to generate w inter-host interaction graphs $D_t=\langle IRG_{t-w}, IRG_{t-w+1}, IRG_{t-1}\rangle$ before the current time slot t: inputting $D_t$ into the prediction model trained in the step 2-3) to predict and obtain an adjacent matrix $pIRA_t$ at the time slot t; comparing the adjacent matrix $pIRA_t$ with a real adjacent matrix $IRA_t$ at the time slot t, and determining whether the interaction between the hosts $H_i$ and $H_j$ at the time slot t is abnormal; and
  3) Cross-host network attack detection: firstly constructing a cross-host anomaly association graph according to intra-host and inter-host anomaly detection results, then propagating anomaly scores by employing a PageRank algorithm, and finally confirming an attacked host based on the anomaly scores; wherein detailed steps of cross-host complex network attack detection in step 3) are as follows:

3-1) constructing a cross-host anomaly association graph: constructing a cross-host anomaly association graph CG as follows according to a given time slot t, an intra-host data collection time span w, and a set HS of hosts in the target network, wherein a cross-host anomaly association graph is constructed as follows according to the step 3-1):

3-1-1) collecting system log data of each host generated between time slots t-w and t, to construct the association graph $rIAG_k$:

3-1-2) based on the association graph $rIAG_k$ in the step 3-1-1), detecting abnormal nodes in the association graph $rIAG_k$ according to step 1-5), performing anomaly scoring for each host according to step 1-6), and recording the anomaly score as $s_k$:

3-1-3) collecting the inter-host interaction graphs generated between the time slots t-w and t, and forming a sequence $D_t = \langle IRG_{t-w}, IRG_{t-w+1}, \ldots, IRG_{t-1} \rangle$ of the inter-host interaction graphs:

3-1-4) following step 2-4) to detect any inter-host abnormal interaction at the time slot t; and 3-1-5) constructing a cross-host anomaly association graph CG;

3-2) propagating the anomaly scores: using the PageRank algorithm to iteratively update a weight of each node in the cross-host anomaly association graph CG; wherein detailed steps of the step 3-2) are as follows:

3-2-1) setting an initial weight $PR(P_k)$ of each node $p_k$ in the cross-host anomaly association graph CG as an anomaly score $s_k$ of the host $H_k$:

3-2-2) updating the weight of each node $p_k$ in the cross-host anomaly association graph CG according to the formula (3); in the formula (3), d is a damping coefficient, $N_{CG}$ is the number of nodes in CG, $I(p_k)$ is a set of nodes corresponding to all incoming edges of the node $p_k$, and $L(p_i)$ is an outgoing degree of the node $p_i$; and $$PR(p_k) = \frac{1-d}{N_{CG}} + d\left(\sum_{p_i \in I(p_k)} \frac{PR(p_i)}{L(p_i)}\right) \quad (3)$$

3-2-3) when weight variation of any node after this iteration is less than a specified threshold, or the number of iterations reaches a specified upper limit, stopping the iteration, otherwise jumping to the step 3-2-2) to restart the iteration; and 3-3) detecting an attacked host: confirming a host represented by a node in the cross-host anomaly association graph CG whose weight is higher than the specified threshold as the attacked host, and confirming a pair of attacked hosts connected by an edge as lateral movement targets of an attacker.

2. The complex network attack detection method based on cross-host abnormal behavior recognition according to claim 1, wherein a structure of the prediction model in the step 2-3) comprises the following four layers:

an input layer: an adjacent matrix $IRA_k$ of an edge set of an inter-host interaction graph is inputted;

a convolutional layer: each $IRA_k$ is inputted into a convolutional neural network to generate a feature matrix $CM_k$;

a circulation layer: t continuous feature matrices $CM_k$ are inputted into an LSTM to generate a feature matrix RM; and an output layer: RM is inputted into a fully connected neural network to generate an adjacent matrix $pIRA_t$ at a predicted time slot t.

* * * * *